United States Patent
Komiya et al.

(10) Patent No.: US 6,510,682 B2
(45) Date of Patent: Jan. 28, 2003

(54) CABLE DRAG CHAIN

(75) Inventors: Shoichiro Komiya, Osaka (JP); Takayuki Matsuda, Osaka (JP); Michiyo Mizumoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/951,474

(22) Filed: Sep. 13, 2001

(65) Prior Publication Data

US 2002/0029555 A1 Mar. 14, 2002

(30) Foreign Application Priority Data

Sep. 13, 2000 (JP) .................. 2000-278471

(51) Int. Cl.[7] .................. F16L 11/00; F16G 13/16
(52) U.S. Cl. .................. 59/78.1; 248/49
(58) Field of Search .................. 59/78, 78.1; 248/49, 248/51

(56) References Cited

U.S. PATENT DOCUMENTS

| | | | | |
|---|---|---|---|---|
| 3,779,003 A | * | 12/1973 | Boissevain et al. | 59/78.1 |
| 4,373,324 A | * | 2/1983 | Janos | 59/78.1 |
| 4,384,594 A | | 5/1983 | Moritz | |
| 4,392,344 A | | 7/1983 | Gordon | |

FOREIGN PATENT DOCUMENTS

| | | | | |
|---|---|---|---|---|
| DE | 91 09 442.4 | | 7/1991 | |
| DE | 93 18 441.7 | | 12/1993 | |
| EP | 0192852 | * | 9/1986 | 59/78.1 |
| JP | 56-159914 | * | 9/1981 | 59/78.1 |
| JP | 62-15008 | | 4/1987 | |

* cited by examiner

*Primary Examiner*—David Jones
(74) *Attorney, Agent, or Firm*—Woodling, Krost and Rust

(57) ABSTRACT

A cable drag chain includes a plurality of ring-like inner links pined together at front and rear ends thereof. Each of the inner links has opposite end faces serving as stopper surfaces engageable with the stopper surfaces of the adjacent inner links to limit the angle of pivotal movement between the adjacent inner links. A ring-like outer link is detachably mounted to a joint portion between two adjacent inner links and surround the joint portion so as to close a space formed between the two adjacent inner links.

6 Claims, 10 Drawing Sheets

CABLE DRAG CHAIN

This application claims the benefit of Japanese Patent Application 2000-278471 filed Sep. 13, 2000.

BACKGROUND OF THE INVENTION

The present invention relates to a cable drag chain for supporting and guiding such flexible members as electric cables and hydraulic or pneumatic hoses between a fixed portion and a movable portion of a machine tool, an earth-moving machine, a conveyor and so on.

Cable drag chains have been proposed to support and guide flexible members, such as electric cables and hydraulic or pneumatic hoses, while protecting the flexible members against damage or entanglement which may occur due to undue twisting or stretching of the flexible members during movement of the movable part of a machine tool, earth-moving machine or conveyor to which the flexible members are connected.

One example of such conventional cable drag chains is disclosed in Japanese Patent Publication No. SHO-62-15008, entitled "Energy Conduit Support". The disclosed energy conduit support includes inner tubular members made from synthetic resin and outer tubular members made of metal and arranged alternately with the inner tubular members in the longitudinal direction of the energy conduit support. Each of the inner tubular members has two sector-like grooves formed at the outer periphery on each of two opposite side of the inner tubular member. Each of the outer tubular members is composed of a pair of upper and outer tubular member halves connected together by pins so that the pin-connected tubular member halves surround opposed end portions of two adjacent inner tubular members. The joint between the inner and outer tubular members in the longitudinal direction of the energy conduit support is formed by way of fitting engagement between the sector-like grooves of the inner tubular member and stopper projections formed on the respective inner peripheries of the outer tubular member halves.

In the energy conduit support shown in the Japanese publication specified above, since the inner tubular members are not connected together by themselves, a framework of the energy conduit support is constituted by the outer tubular member halves pined together to form an outer tubular member. Due to this construction, the conventional energy conduit support as a whole has a relatively low torsional rigidity. In addition, since the bending angle of the energy conduit support is limited by abutting engagement between the grooves of the inner tubular members and the stopper projections of the outer tubular members, the energy conduit support is likely to be damaged when subjected to a relatively large force.

When pins are removed, the outer tubular member halves and the adjacent inner tubular members are disconnected from one another, thus forming a break or interruption in the energy conduit support. Reassembling of the inner and outer tubular members to mend the break is uneasy to achieve. In addition, once the outer tubular member halves and the inner tubular members are assembled together, disassembling work of these components is tedious and time-consuming. When the disassembled components are to be assembled again, the pins must be replaced with new ones. This replacement increases the cost of the energy conduit support and makes the energy conduit support unsuitable for an application in which a frequent maintenance and inspection is a major requirement.

Furthermore, the inner tubular members made from synthetic resin are susceptible to abrasive wear and produce plastic powder due to friction contact with the outer tubular member halves made of metal during use of the energy conduit support. Use of the metallic material increases the overall weight of the energy conduit support and produces a great noise when the metallic outer tubular members abut on the adjacent plastic inner tubular member or beat the floor surface during use of the energy conduit support.

SUMMARY OF THE INVENTION

With the foregoing problems in view, it is an object of the present invention to provide a cable drag chain which has relatively large bending and torsional rigidities and hence can hold flexible members safely against undue bending or twisting, is light in weight, can be manufactured at a relatively low cost, produces little abrasive powder, is easy to assemble and maintain and produces little noise during use.

According to the present invention, there is provided a cable drag chain comprising a plurality of ring-like inner links pivotally connected together end to end. Each of the inner links has a pair of connecting pins formed at one end thereof, a pair of pin holes formed at the opposite end thereof for receiving the connecting pins of an adjacent one of the inner links to thereby connect two adjacent ones of the inner links, and end faces formed at the front and rear ends of the inner link and serving as stopper surfaces engagable with the stopper surfaces of the adjacent inner links to limit the angle of pivotal movement between the adjacent inner links. The cable drag chain further includes a plurality of outer links, each outer link being detachably mounted to a joint portion between two adjacent one of the inner links and surrounding the joint portion so as to close a space formed between the two adjacent inner links.

In one preferred form of the present invention, the inner link has two circumferential grooves spaced in an axial direction of the inner link, and the outer link has a pair of annular end flanges formed at opposite ends thereof. The end flanges being received in adjacent two circumferential grooves of each pair of adjacent inner links. The hollow interior space formed in the cable drag chain is fully closed so that dust produced inside the cable drag chain is held within the closed hollow interior space without leakage.

It is preferable that when the stopper surfaces of two adjacent inner links are in contact with each other, the outside distance between the end flanges of the outer link is larger than the distance between opposed sidewalls of the adjacent two circumferential grooves with which the end flanges are engaged. By virtue of the dimensional difference, the end flanges engage the sidewalls of the circumferential grooves in advance to the abutment between the stopper surfaces of two adjacent inner links, thereby lessening a collision sound of the cable drag chain. To enhance the noise reducing effect, a synthetic resin forming the outer link is more flexible than a synthetic resin forming the inner link.

It is preferable that the inner link is molded of a synthetic resin, and the outer link is molded of a synthetic resin.

In one preferred form of the present invention, the outer link is composed of a pair of outer link members of an identical shape and configuration detachably connected at opposite ends, one end of each outer link member has a connecting pin, and the other end of each link member has a pin hole for receiving therein the connecting pin.

In another preferred form of the present invention, the outer link is comprised of a hinged one-piece outer link having a hinge portion at one side thereof and a pin and pin-hole connection at the other side of thereof.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
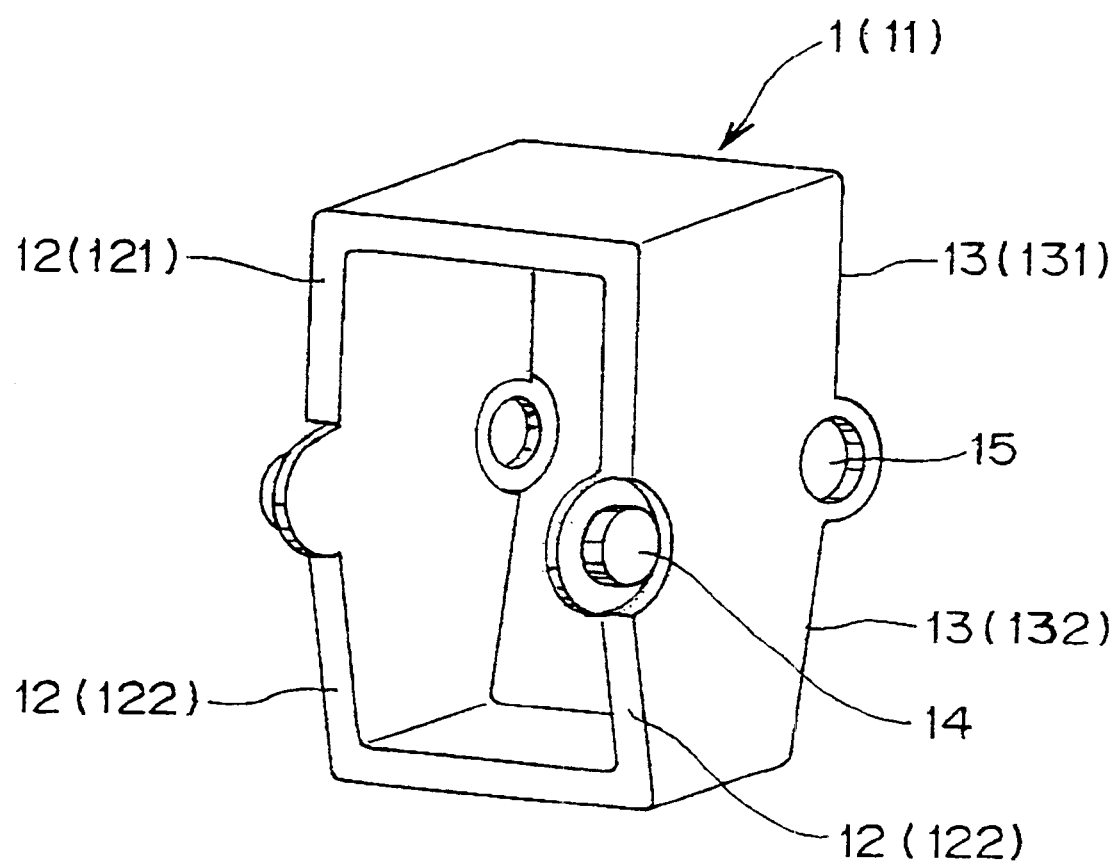
FIG. 1 is a perspective view of an inner link of a cable drag chain according to a first embodiment of the present invention.

Referring now to the drawings and FIG. 1 in particular, there is shown in perspective view an inner link 1 of a cable drag chain according to a first embodiment of the present invention. The inner link 1 is comprised of a hollow, rectangular ring-like member 11 molded of a synthetic resin. The hollow ring-like inner link 1 (11) has a pair of connecting pins 14 formed in diametrically opposite relation at the center of a front end 12 (left end in FIG. 1) thereof, and a pair of diametrically opposite pin holes 15 formed in diametrically opposite relation at the center of a rear end 13 (left end in FIG. 1) thereof. The connecting pins 14 and the connecting holes 15 of the inner link 1 are rotatably fitted with the pin holes 15 and the connecting pins 14, respectively, of two inner links 1 that are disposed on front and rear sides of the inner link 1, as shown in FIG. 2.

The front and rear ends 12 and 13 of the inner link 1 each have an upper end face portion 121, 131 and a lower end face portion 122, 132 extending upward and downward, respectively, from a vertical central portion of the corresponding end 12, 13. The upper front and rear end face portions 121, 131 extend parallel with each other, while the lower front and rear end face portions 122, 132 extend convergently with each other. As shown in FIG. 2, when a cable drag chain having plural interconnected inner links 1 is bent about a center O, the lower front and rear end face portions 122, 132 of adjacent two inner links 1, 1 abut with each other so that the maximum bending angle of the cable drag chain is limited to an angle α. The lower front and rear end face portions 122, 133 each extend obliquely at an angle Y (α/2) with respect to a vertical centerline of the inner link 1. The upper front and rear end face portions 121, 131 of each inner link 1 come into abutment with upper rear and front end face portions 131, 121 of the adjacent inner links 1 so as to prevent the cable drag chain from bending reversely into a downwardly projecting U-shape.

Since the inner link 1 is molded of synthetic resin, the lower end face portions 122, 132 of the molded inner link 1 have a certain width. When the cable drag chain is caused to bend, the lower end face portion 122 (132) of each inner link 1 comes into abutment with the lower end face portion 132 (122) of the adjacent inner link 1 over the entire area thereof to thereby prevent further bending of the cable drag chain. By thus limiting the bending angle of the cable drag chain, flexible members, such as electric cables and hydraulic or pneumatic hoses, held in the cable drag chain can be protected safely against damage. The lower end face portions 122, 132 of the inner link 1 form stopper surfaces.

Figure 2:
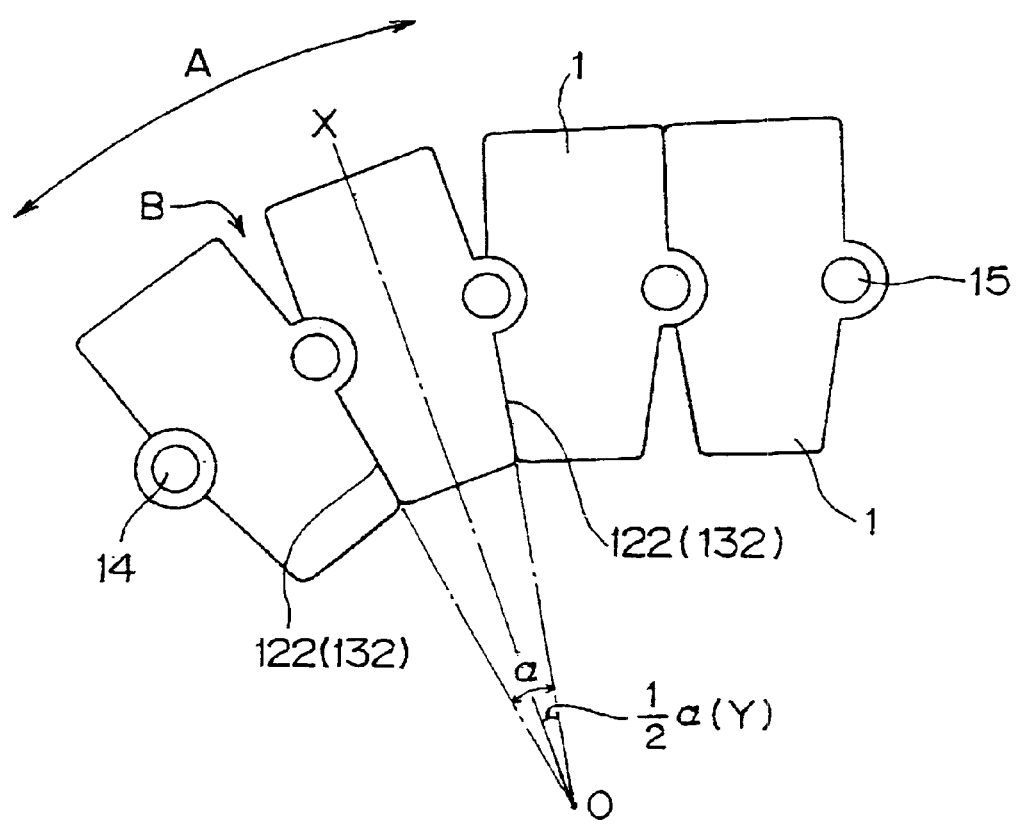
FIG. 2 is a side view showing plural inner links connected end to end.

As shown in FIG. 2, plural inner links 1 connected end to end form an elongated framework of the cable drag chain. Each of the inner links 1 is pivotally movable relative to the adjacent inner link 1 between an upright position in which the respective central axes of the adjacent two inner links 1, 1 extend straight, and a tilted position in which the adjacent inner two links 1, 1 are tilted with each other at an angle of α. At a bent or curved portion A of the framework, a space B is formed between the adjacent two inner links 1, 1.

Figure 3:
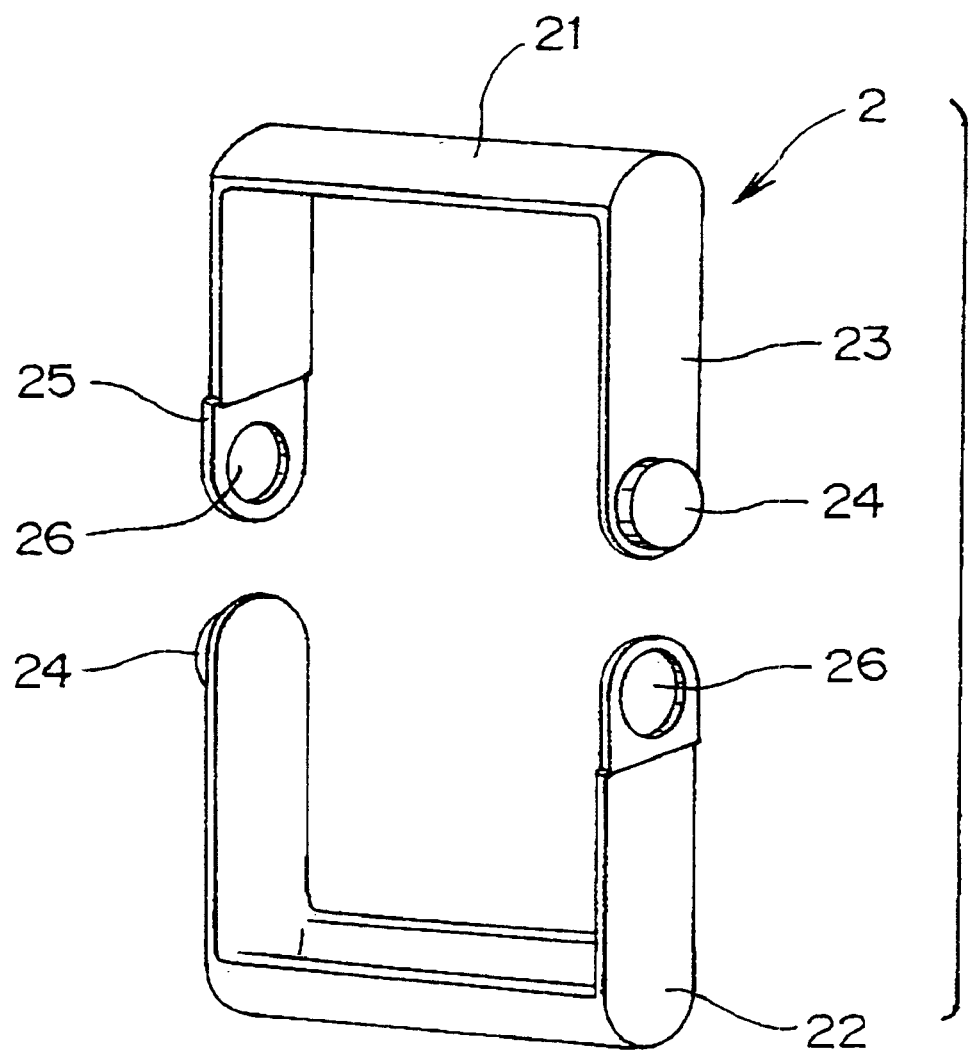
FIG. 3 is an exploded perspective view of an outer link of the cable drag chain.

In order to close the space B, an outer link 2 (FIG. 3) is used. As shown in FIG. 3, the outer link 2 is composed of a pair of generally U-shaped upper and lower outer link members 21 and 22 having a width larger than a maximum width of the space B. Each of the U-shaped outer link members 21, 22 has an outwardly projecting connecting pin 24 formed at one end and thereof and a pin hole 26 formed at the opposite end thereof for snugly receiving therein the connecting pin 24 of the other outer link member 22, 21. The end including the pin hole 26 is offset outward from the plane of one leg of the U-shaped outer link member 21, 22 by a distance equal to the thickness of the outer link member 21, 22. In the illustrated embodiment, the upper and lower outer link members 21, 22 are identical in shape and configuration so as to reduce the number of parts used to form a complete cable drag chain. In assembly, the U-shaped upper and lower outer link members 21, 22 are held in vertical disposition with their open ends facing each other, and the connecting pin 24 and pin hole 26 of the upper outer link member 21 are fitted with the pin hole 26 and connecting pin 24 of the lower outer link member 22. Thus, the upper and lower outer link members 21, 22 are detachably connected with each other to form a single outer link 2.

Figure 4:
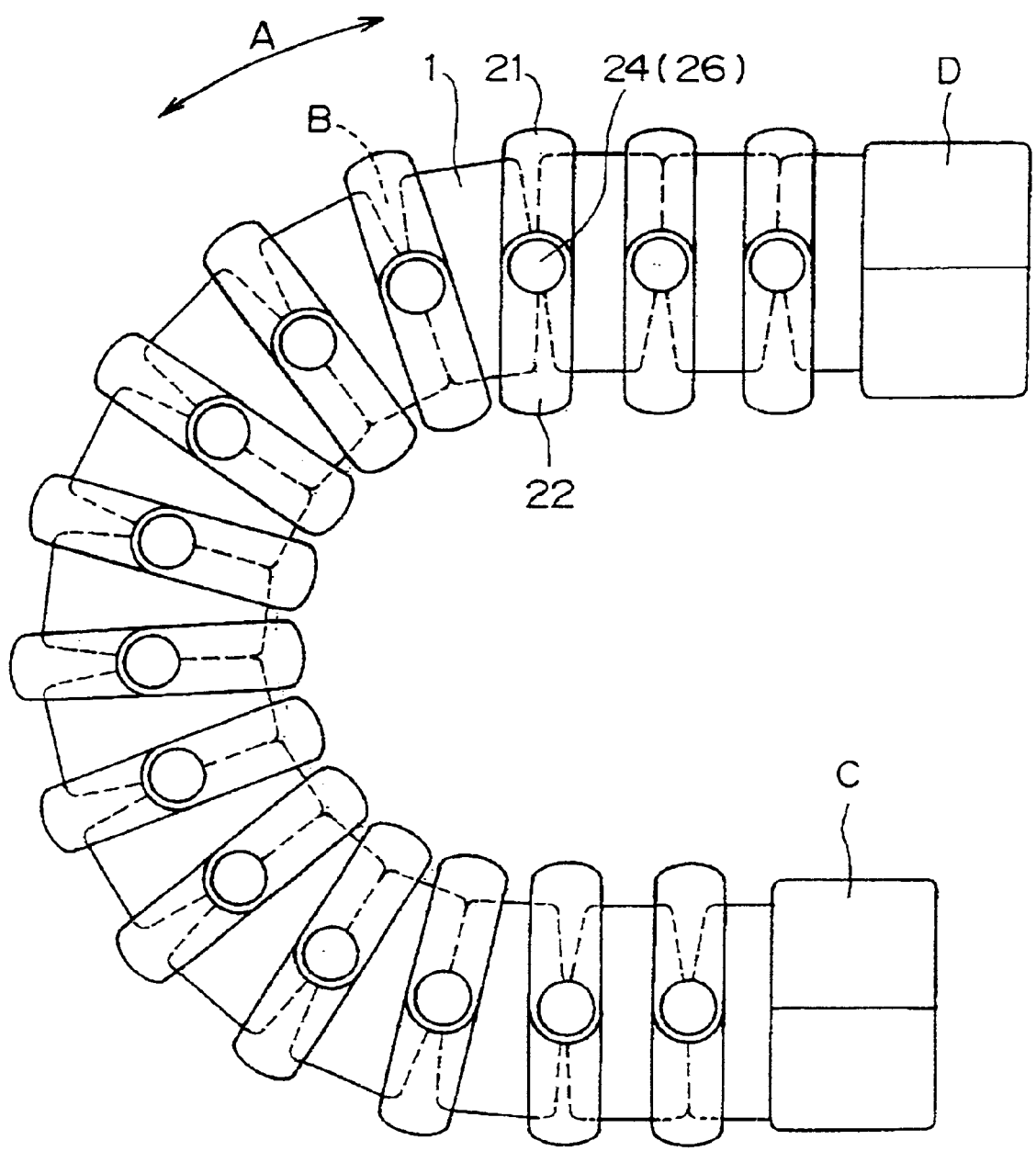
FIG. 4 is a side view showing an assembled condition of the cable drag chain according to the first embodiment of the present invention.

After plural inner links 1 are connected end to end to form an elongated framework, plural outer links 2 are mounted on the framework such that a joint portion between adjacent two inner links 1 is covered by one outer link 2. A cable drag chain is thus produced. In use, the framework (formed by interconnected inner links 1) of the cable drag chain is connected at one end to a fixed portion C of a machine tool, for example, and at the other end to a movable member D, such as a tool slide, of the machine tool, as shown in FIG. 4. In the cable drag chain, a space B formed between adjacent two inner links 1, 1 at a bent or curved portion of the cable drag chain is closed by the outer link 2 fitted around the outer periphery of a joint portion between the adjacent two inner links 1, 1. By the inner and outer links 1, 2 thus assembled, a hollow interior space formed inside the cable drag chain is fully closed and concealed from the view. With this arrangement, dust which may be produced inside the cable drag chain is held inside the cable drag chain against leakage.

Since a framework of the cable drag chain is formed by a plurality of interconnected hollow rectangular molded inner links 1, the cable drag chain as a whole has a high torsional rigidity. When the cable drag chain is bent or curved in one direction, the end face portions of adjacent two inner lings come in abutment with each other over the entire area thereof to thereby limit the radius of curvature of a bent or curved portion while restricting the angle of bend in the opposite direction (no-back-bend direction), the cable drag chain is highly rigid and resistant against damage even when subjected to an external force. Additionally, since the face-to-face contact between the opposed end face portions of the adjacent two inner links 1 can achieve accurate restriction of angular movement between the adjacent inner links 1, the flexible members received inside the cable drag chain are completely free from undue bending.

Furthermore, by the outer link 2 fitted around the outer periphery of a joint portion between adjacent two inner links, a space B formed at the joint portion when the cable drag chain is bent is closed by the outer link 2. Thus, the hollow interior space of the cable drag chain is fully closed. This arrangement is advantageous because dust produced inside the cable drag chain can be held within the closed hollow interior space of the inside the cable drag chain against leakage. Additionally, since the outer links 2 have no function to join or connect the adjacent inner links 1, nor to limit the bending angle of the cable drag chain, it is possible to reduce the thickness and weight of the outer links 2, leading to a reduction of the manufacturing cost of the outer links 2.

Because all of the parts (i.e, the inner and outer links 1 and 2) of the cable drag chain are molded of synthetic resin, the cable drag chain as a whole is light in weight, can be manufactured at a relatively low cost, produces little amount of plastic powder due to abrasive wear of the links 1, 2, and is able to reduce a noise produced when the inner and outer links collide with each other during movement of the cable drag chain.

By using the inner links 1 molded of synthetic resin, it is possible to reduce a noise produced when the cable drag chain beats the floor surface on which the machine tool is installed. Additional noise reducing effect can be obtained by using the outer links 2 molded of synthetic resin.

The connection between the adjacent inner links 1, 1 and the connection between the upper and lower outer link members 21, 33 are both achieved by fitting engagement between the connecting pins 14, 24 and the pin holes 15, 26. Such pin and pin-hole connection can be assembled and disassembled with utmost ease. Since the upper and lower outer link members 21, 22 are identical in shape and configuration, the number of parts used to form the cable drag chain is reduced.

Figure 5A:
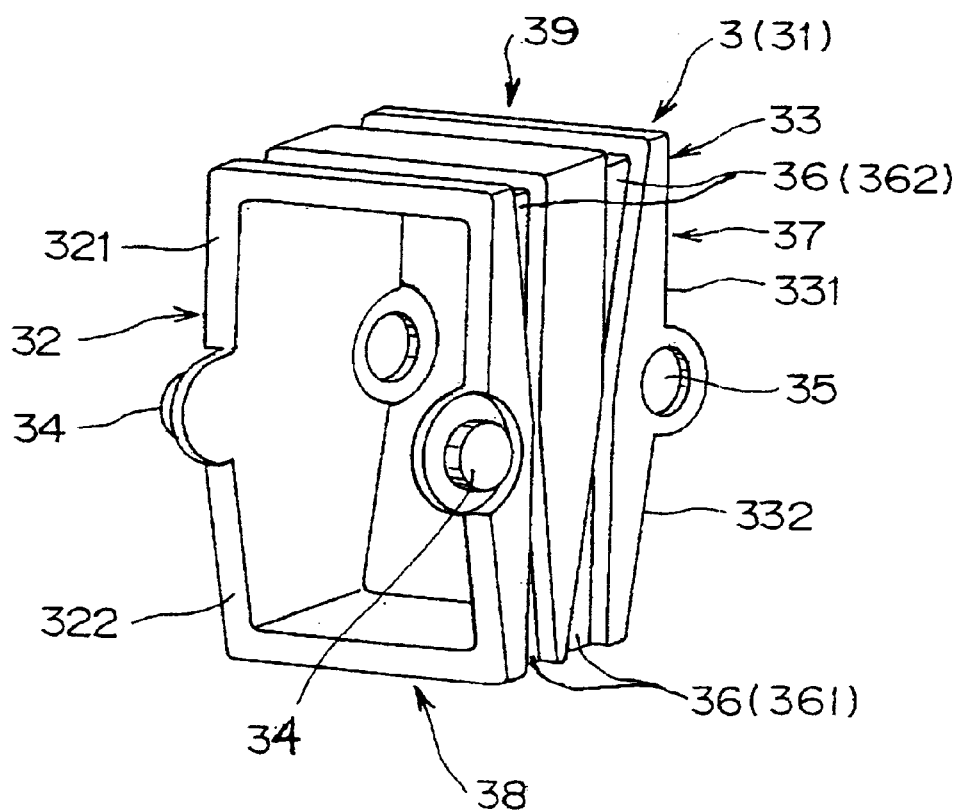
FIG. 5A is a perspective view of an inner link of a cable drag chain according to a second embodiment of the present invention.
Figure 5B:
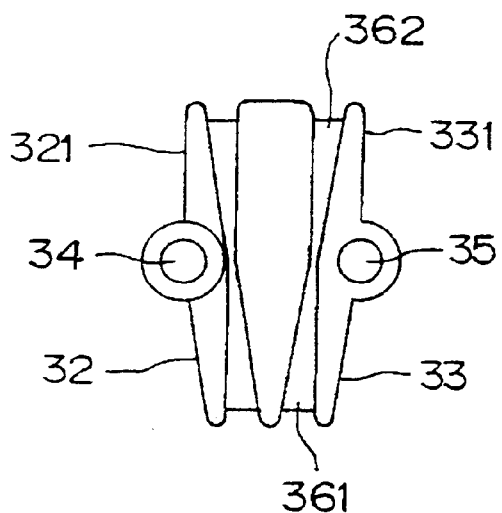
FIG. 5B is a side view of the inner link shown in FIG. 5A.
Figure 5C:
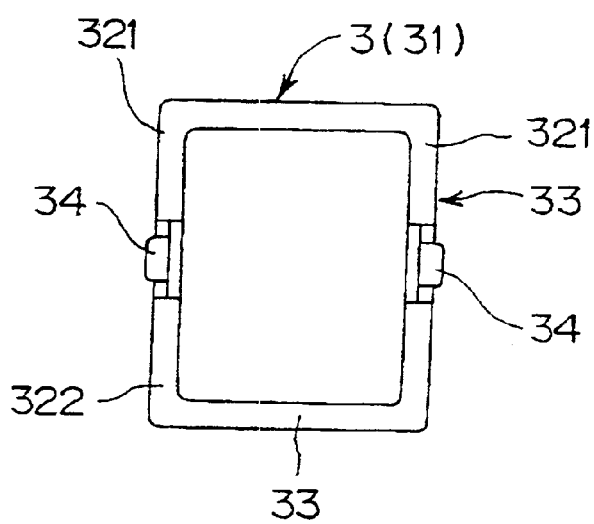
FIG. 5C is a front elevational view of the inner link shown in FIG. 5A.
Figure 6:
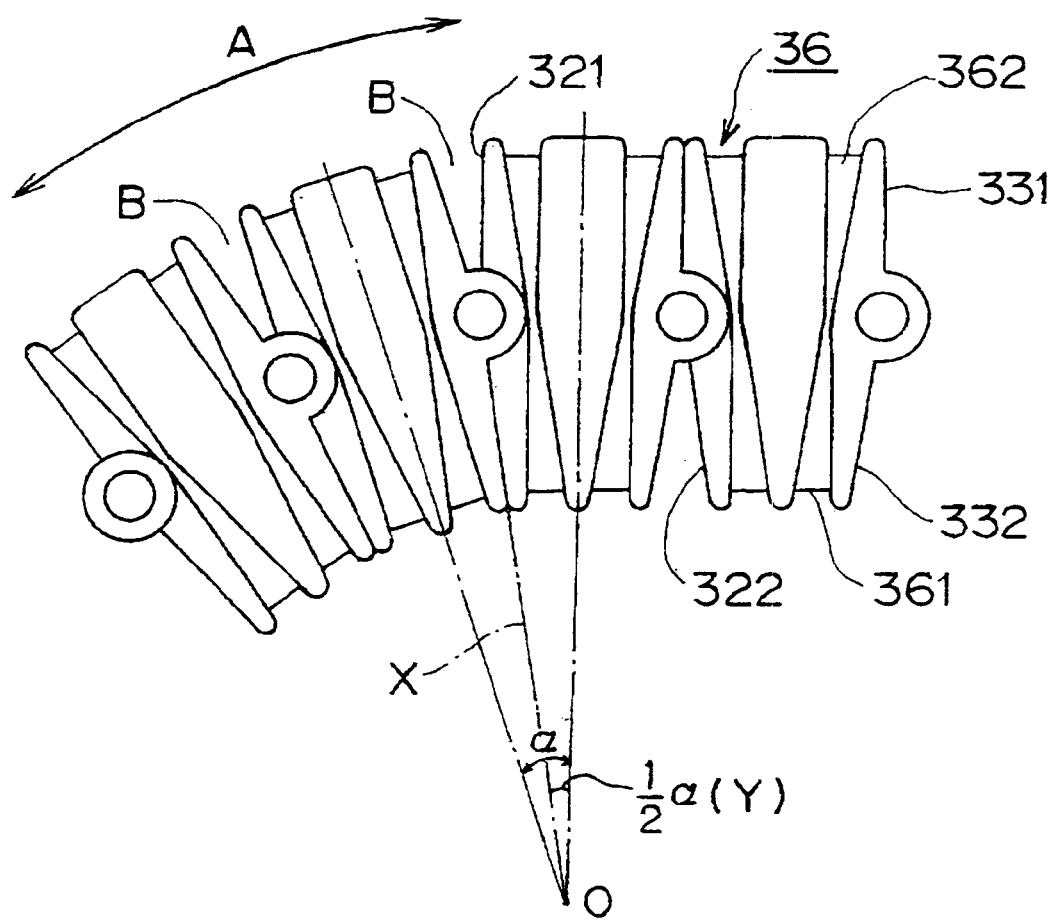
FIG. 6 is a side view showing plural inner links shown in FIGS. 5A–5C.

FIGS. 5A to 5C show a inner link 3 used in a cable drag chain according to a second embodiment of the present invention. The inner link 3 is composed of a hollow rectangular ring-like member 31 molded of synthetic resin and has a certain thickness. The ring-like inner link 3 has a front end 32 and a rear end 33. At a central portion of the front end 32, a pair of connecting pins 34 is formed in diametrically opposite relation. Similarly, at a central portion of the rear end 23, a pair of pin holes 35 is formed in diametrically opposite relation for rotatably receiving the connecting pins 34, respectively, of an adjacent inner link 3. By way of the pin and pin-hole connection, a plurality of such inner links 1 are connected end to end, as shown in FIG. 6, so as to form an elongated cable drag chain.

The front and rear ends 32 and 33 (FIG. 5A) of the inner link 3 each have an upper end face portion 321, 331 and a lower end face portion 322, 332 extending upward and downward, respectively, from a vertical central portion of the corresponding end 32, 33. The upper front and rear end face portions 321, 331 extend parallel with each other, while the lower front and rear end face portions 322, 332 extend convergently with each other. As shown in FIG. 6, when a cable drag chain having plural interconnected inner links 3 is bent about a center O, the lower front and rear end face portions 322, 332 of adjacent two inner links 3, 3 abut with each other so that the maximum bending angle of the cable drag chain is limited to an angle $\alpha$. The lower front and rear end face portions 122, 133 each extend obliquely at an angle $Y$ ($\alpha/2$) with respect to a vertical centerline of the inner link 3. The upper front and rear end face portions 321, 331 of each inner link 3 come into abutment with upper rear and front end face portions 331, 321 of the adjacent inner links 3 so as to prevent the cable drag chain from bending reversely into a downwardly projecting U-shape.

The lower end face portions 322, 332 of the molded inner link 3 have a certain width. When the cable drag chain is caused to bend, the lower end face portion 322 (332) of each inner link 3 comes into abutment with the lower end face portion 332 (322) of the adjacent inner link 3 over the entire area thereof to thereby prevent further bending of the cable drag chain. By thus limiting the bending angle of the cable drag chain, flexible members, such as electric cables and hydraulic or pneumatic hoses, can be safely held inside the cable drag chain without damage. The lower end face portions 322, 332 of the inner link 3 form stopper surfaces.

Figure 9A:
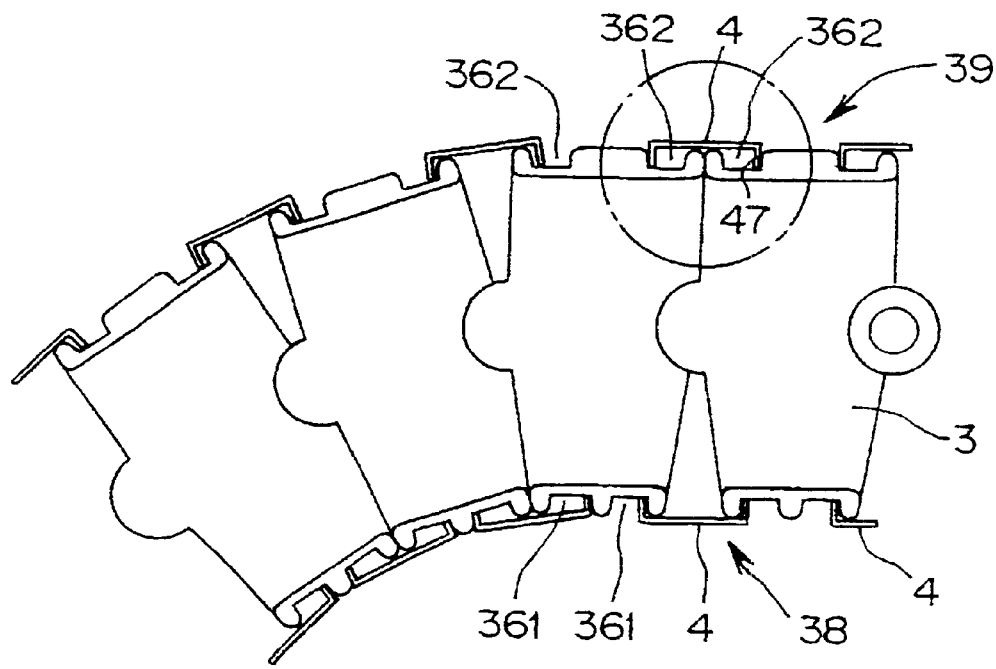
FIG. 9A is a cross-sectional view of the cable drag chain shown in FIG. 8.
Figure 9B:
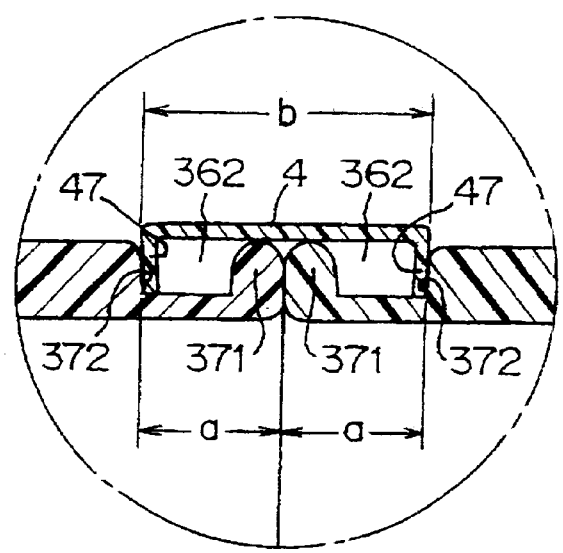
FIG. 9B is an enlarged view of a portion of FIG. 9A.

As shown in FIG. 5A, the inner link 3 has two circumferential grooves 36, 36 formed in the outer peripheral surface and spaced in the axil direction of the hollow inner link 3, so that the grooves 36, 36 are located adjacent the front end 32 and the rear end 33, respectively, of the inner link 3. Each of the circumferential grooves 36 has a lower groove portion 361 extending along a lower half of the perimeter of the inner link 3, and an upper groove portion 362 extending along an upper half of the perimeter of the inner link 3. At each of two opposite side walls 37 of the inner link 3, the lower groove portion 361 takes the form of a triangle, while the upper groove 362 takes the form of an inverted triangle. As best shown in FIGS. 9A and 9B, the lower and upper groove portions 361 and 362 are formed in a bottom wall 38 and a top wall 39, respectively, of the inner link 3, so as to allow end flanges 47 (FIG. 7) of an outer link 4 to move relative to adjacent two inner links 3, as will be described later.

As shown in FIG. 6, plural inner links 3 are connected end to end to form an elongated framework of the cable drag chain. Each of the inner links 3 is pivotally movable relative to the adjacent inner link 3 between an upright position in which the respective central axes of the adjacent two inner links 3, 3 extend straight, and a tilted position in which the adjacent inner two links 3, 3 are tilted with each other at an angle of $\alpha$. At a bent or curved portion A of the framework, a space B is formed between the adjacent two inner links 3, 3.

Figure 7:
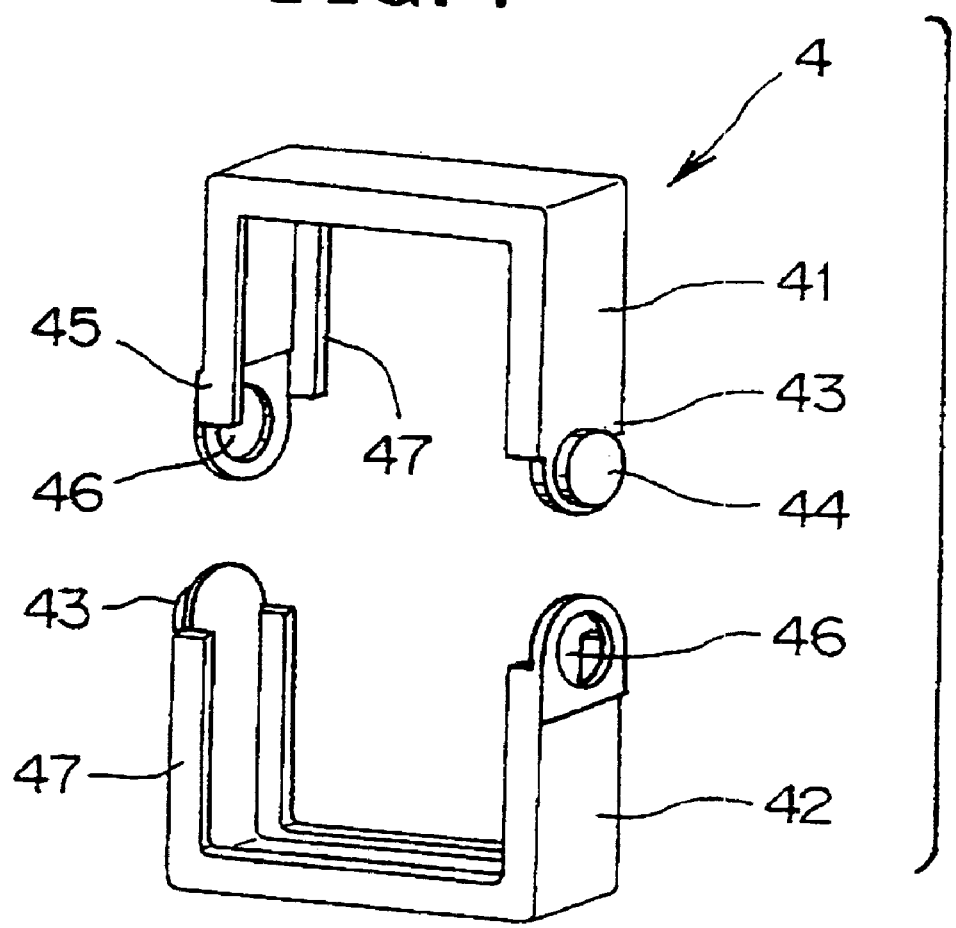
FIG. 7 is an exploded perspective view of an outer link of the cable drag chain according to the second embodiment.

The outer link 4 shown in FIG. 7 is used to close the space B (FIG. 6). As shown in this figure, the outer link 4 is composed of a pair of generally U-shaped upper and lower outer link members 41 and 42 having a width larger than a maximum width of the space B. Each of the U-shaped outer link members 41, 42 has an outwardly projecting connecting pin 44 formed at one end 43 and thereof and a pin hole 46 formed at the opposite end 45 thereof for snugly receiving therein the connecting pin 44 of the other outer link member 42, 41. The end 45 including the pin hole 46 is offset outward from the plane of one leg of the U-shaped outer link member 41, 42 by a distance equal to the thickness of the outer link member 41, 42. In the illustrated embodiment, the upper and lower outer link members 41, 42 are identical in shape and configuration so that the number of parts used to form a complete cable drag chain can be reduced. In assembly, the U-shaped upper and lower outer link members 41, 42 are held in vertical disposition with their open ends facing each other, and the connecting pin 44 and pin hole 46 of the upper outer link member 41 are fitted with the pin hole 46 and connecting pin 44 of the lower outer link member 22. Thus, the upper and lower outer link members 41, 42 are detachably connected with each other to form a single outer link 4.

Each of the outer link members 41, 42 has a pair of end flanges 47, 47 extending along the front and rear edges thereof. The end flanges 47 project in a radial inward direction of the outer link member 41, 42. When the upper and lower outer link members 41, 42 are assembled together, the end flanges 47 of the respective link members 4, 42 form a pair of annular end flanges 47 formed at the front and rear ends, respectively, of the outer link 4. The annular end flanges 47 are received in adjacent two circumferential grooves 36, 36 of each pair of adjacent inner links 3, 3. The annular end flanges 47 serve also as a stopper to prevent relative pivotal movement between the upper and lower outer link members 41, 42 while the link members 41, 42 are in the assembled state.

Figure 8:
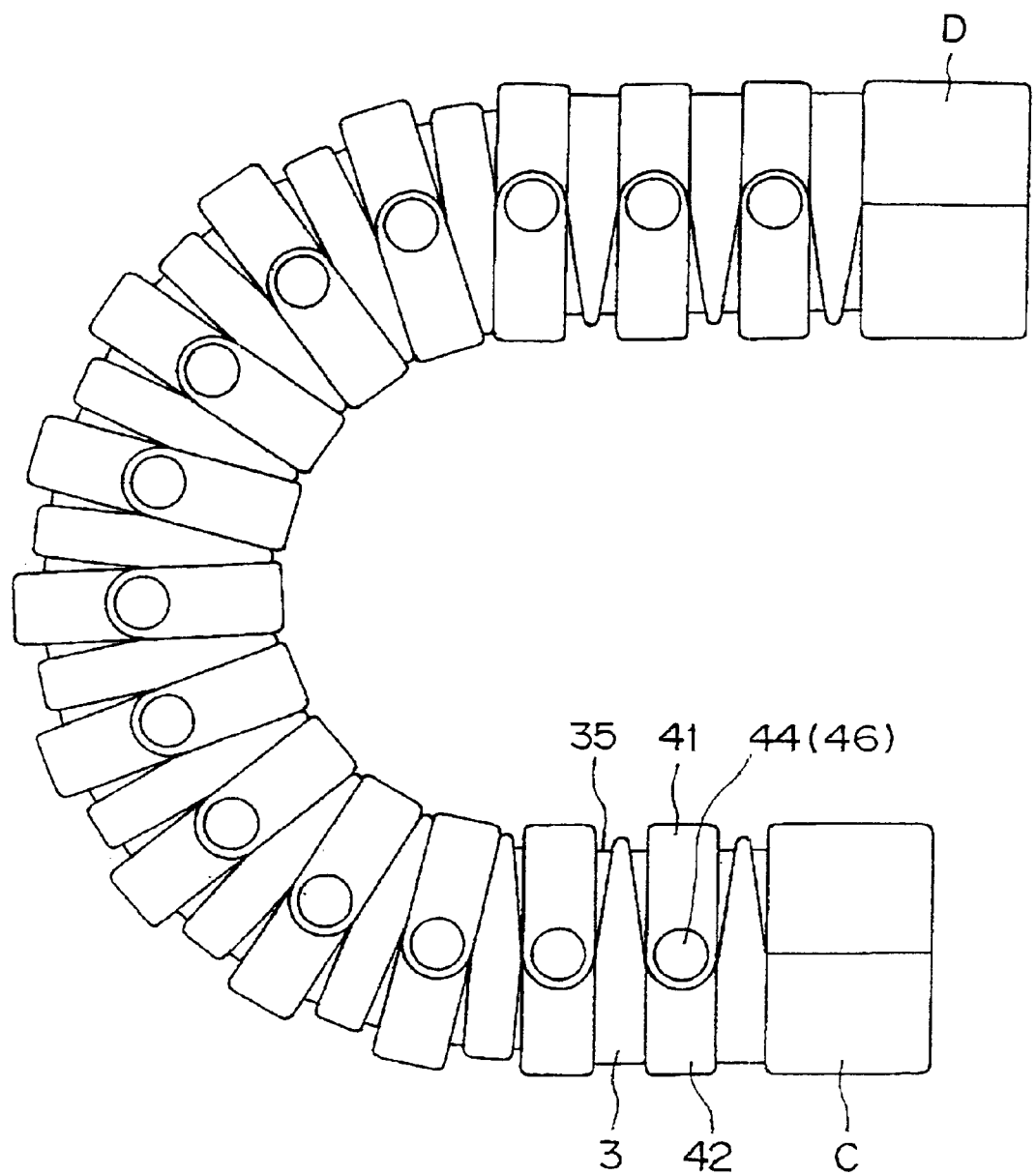
FIG. 8 is a side view showing an assembled condition of the cable drag chain according to the second embodiment of the present invention.

After plural inner links 3 are connected end to end to form an elongated framework, plural outer links 4 are mounted on the framework so that a joint portion between adjacent two inner links 3 is covered by one outer link 4. A cable drag chain is thus produced. In use, the framework (formed by interconnected inner links 3) of the cable drag chain is connected at one end to a fixed portion C of a machine tool, for example, and at the other end to a movable member D, such as a tool slide, of the machine tool, as shown in FIG. 8. In the cable drag chain, a space B (FIG. 6) formed between adjacent two inner links 3, 3 at a bent or curved portion of the cable drag chain is closed by the outer link 4 fitted around the outer periphery of a joint portion between the adjacent two inner links 3, 3. In this instance, the annular end flanges 47 of the outer link 4 are engaged in two adjacent circumferential grooves 36 in each pair of adjacent inner links 3, 3. By the inner and outer links 3, 4 thus assembled, a hollow interior space formed inside the cable drag chain is fully closed and concealed from the view.

It is preferable that the synthetic resin material forming the outer link 4 is greater in flexibility of the synthetic resin material forming the inner link 3. As shown in FIG. 9B, the width b of the outer link 4 in the longitudinal direction of the cable drag chain (i.e., the outside distance between the front and rear end flanges 47 of the outer link 4) is more than twice as large as a combined width a of the groove 362 (361) and an adjacent end edge portion 371 of the inner link 3 (i.e., the distance between inner sidewalls 372, 372 of adjacent two grooves 362, 372 with which the end flanges 47, 47 of the outer link 4 engage).

In other words, when the stopper surfaces at the front and rear ends of adjacent two inner links 3, 3 are in face-to-face contact with each other, the outside distance b between the front and rear end flanges 47 of the outer link 4 is slightly greater than the distance (a×2) between inner sidewalls 372 of the adjacent grooves 362 (361) with which the front and rear end flanges 47 engage (b>2a).

The cable drag chain of the second embodiment is advantageous over the cable drag chain of the first embodiment shown in FIGS. 1–4 in that by virtue of the engagement between the end flanges 47 of the outer link 4 and the grooves 36 of two adjacent inner links 3, the outer link 4 is held in position against removal from the inner links 3 even when the individual inner links 3 moves relative to one another. The internal space formed in the cable drag chain is always closed and concealed from the view. This arrangement ensures that dust produced inside the cable drag chain is held inside the cable drag chain against leakage.

In addition, partly because the outside distance b between the front and rear end flanges 47 of the outer link 4 is slightly larger than the distance (2×a) between inner side walls 372 of the adjacent grooves 36 of each pair of adjacent inner links 3, 3 (b>2a), and partly because the synthetic resin material forming the outer link 4 is more flexible than the synthetic resin material of the inner link 3, when the cable drag chain is caused to bend, the end flanges 47 of the outer link 4 are brought into contact with the inner sidewalls 372 of the grooves 36 and then deform resiliently before the two adjacent inner links 3 abut with each other. With this resilient deformation of the end flanges 47, a noise produced upon abutment of the adjacent inner links 3 can be reduced.

Figure 10:
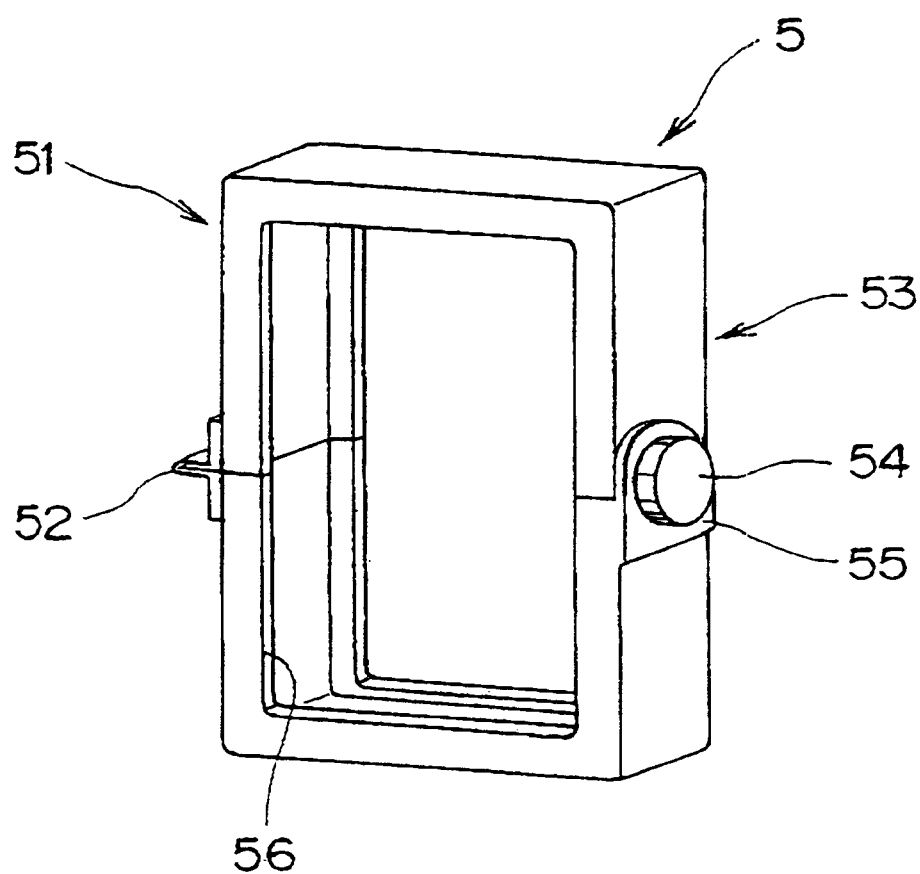
FIG. 10 is a perspective view of an outer link according to a modification of the present invention.

FIG. 10 shows a modified form of the outer link according to the present invention. The modified outer link 5, as opposed to the outer links 2, 4 of the two-piece structure shown in FIGS. 3 and 7, has a hinged one-piece structure integrally molded of synthetic resin. The outer link 5 has a hinge portion 52 at one side 51 so that the outer link 5 can be opened and closed about the hinge 52. To keep the outer link 5 in a closed position, a connecting pin 54 is formed at one of two mating open ends of the outer link 5, and a pin holes 55 is formed in the other open end of the outer link 5 for receiving therein the connecting pin 54. The connecting pin 54 and the pin hole 55 are fitted together at the opposite side 53 of the outer link 5. The outer link 5 has an annular flange 56 at each of the front and rear ends thereof.

The outer link 5 is mounted on a framework formed by interconnected inner links (not shown but identical to one shown in FIG. 6) so as to cover or surround a joint portion formed between adjacent two inner links. Though not shown, the end flanges 56 of the outer link 5 are received in adjacent grooves of each pair of adjacent inner links in the same manner as the end flanges 47 shown in FIG. 9B.

The hinged one-piece outer link 5 further reduces the number of parts of the cable drag chain and can be easily mounted to a joint portion of the inner links 3 as compared to the two-piece pin-connected outer links 2, 4. Other operational features of the outer link 5 are the same as those described above with respect to the outer link 4 shown in FIG. 7.

Obviously, various minor changes and modifications of the present invention are possible in the light of the above teaching. It is therefore to be understood that within the scope of the appended claims, the present invention may be practiced otherwise than as specifically described.

What is claimed is:

1. A cable drag chain comprising:

a plurality of ring-like inner links pivotally connected together end to end, each of said inner links having a pair of connecting pins formed at one end thereof, a pair of pin holes formed at the opposite end thereof for receiving said connecting pins of an adjacent inner link to thereby connect two adjacent inner links, and end faces formed at the front and rear ends of each of said inner links and serving as stopper surfaces engagable with said stopper surfaces of said adjacent inner links to limit the angle of pivotal movement between said adjacent inner links; and a plurality of outer links not pivotally connected to said inner links, each said outer link being detachably mounted to a joint portion between adjacent inner links, each of said outer links surrounding said joint portion so as to close a space formed between said two adjacent inner links, each of said outer links is composed of a pair of outer link members of an identical shape and configuration detachably connected at opposite ends to each other, one end of each said outer link member has an integral pin, and the other end of each outer link member has a pin hole for receiving therein said integral pin.

2. The cable drag chain according to claim 1, wherein each of said inner links has two circumferential grooves spaced axially apart, and each of said outer links has a pair of annular end flanges formed at opposite ends thereof and received in adjacent two circumferential grooves of each pair of adjacent inner links.

3. The cable drag chain according to claim 2, wherein when said stopper surfaces of two adjacent inner links are in contact with each other, the outside distance between the end flanges of the outer link is larger than the distance between opposed sidewalls of said adjacent two circumferential grooves with which said end flanges are engaged.

4. The cable drag chain according to claim 3, wherein each of said inner links is molded of a synthetic resin, and each of said outer links is molded of a synthetic resin, the synthetic resin forming the outer link being more flexible than the synthetic resin forming the inner link.

5. The cable drag chain according to claim 1, wherein each of said inner links is molded of a synthetic resin, and each of said outer links is molded of a synthetic resin.

6. The cable drag chain according to claim 1, wherein each of said outer links is comprised of a hinged one-piece outer link having a hinge portion at one side thereof and a pin and pin-hole connection at the other side of thereof.

* * * * *